US012622337B2

(12) United States Patent　　　　　(10) Patent No.: US 12,622,337 B2
Meid et al.　　　　　　　　　　　　　(45) Date of Patent: May 12, 2026

(54) AGRICULTURAL VEHICLE COMBINATION

(71) Applicant: DEERE & COMPANY, Moline, IL (US)

(72) Inventors: Michael Meid, Waghaeusel (DE); Manuel Billich, Dischingen (DE)

(73) Assignee: DEERE & COMPANY, Moline, IL (US)

( * ) Notice: Subject to any disclaimer, the term of this patent is extended or adjusted under 35 U.S.C. 154(b) by 436 days.

(21) Appl. No.: 18/307,264

(22) Filed: Apr. 26, 2023

(65) Prior Publication Data

US 2023/0354731 A1　　Nov. 9, 2023

(30) Foreign Application Priority Data

May 5, 2022　(DE) .......................... 102022111164.4

(51) Int. Cl.
　　*A01B 59/04*　　(2006.01)
　　*A01B 59/043*　　(2006.01)
　　*B60D 1/14*　　(2006.01)

(52) U.S. Cl.
　　CPC ............ *A01B 59/043* (2013.01); *B60D 1/141* (2013.01)

(58) Field of Classification Search
　　CPC ...... A01B 59/043; A01B 71/06; B60D 1/141; B62D 59/04
　　See application file for complete search history.

(56) References Cited

U.S. PATENT DOCUMENTS

| | | | | |
|---|---|---|---|---|
| 4,484,758 A | * | 11/1984 | Murray | B62D 13/02 |
| | | | | 280/81.6 |
| 6,856,035 B2 | * | 2/2005 | Brandon | B60W 10/08 |
| | | | | 290/40 C |
| 7,540,522 B2 | * | 6/2009 | Friggstad | A01B 69/006 |
| | | | | 280/445 |
| 8,214,111 B2 | * | 7/2012 | Heiniger | G05D 1/0278 |
| | | | | 701/50 |
| 8,672,066 B2 | * | 3/2014 | Momal | B60K 25/00 |
| | | | | 475/5 |
| 8,939,250 B2 | * | 1/2015 | Turner | B62D 59/04 |
| | | | | 180/312 |
| 9,050,890 B2 | * | 6/2015 | Buerkle | B60D 1/62 |
| 9,709,969 B2 | * | 7/2017 | Anderson | A01B 69/00 |
| 10,404,137 B2 | | 9/2019 | Bering | |
| 11,414,120 B2 | * | 8/2022 | Burch, V | B62B 5/0079 |
| 11,422,519 B2 | * | 8/2022 | Anderson | G05D 1/0212 |
| 12,291,287 B2 | * | 5/2025 | Lussier | B62D 55/084 |

(Continued)

FOREIGN PATENT DOCUMENTS

| | | |
|---|---|---|
| DE | 19950138 C1 | 12/2000 |
| RU | 2654743 C1 | 5/2018 |
| SU | 1463149 A1 | 3/1989 |

OTHER PUBLICATIONS

European Search Report issued in application No. 23170390.1, dated Oct. 10, 2023, 7 pages.

*Primary Examiner* — Jamie L McGowan

(57)　　　　　　ABSTRACT

An agricultural vehicle combination including an agricultural tractor, which is operated using a main drive unit, and an ancillary drive unit, which is attached removably to the agricultural tractor by a three-point hitch, and which has an auxiliary axle that can be driven by an ancillary unit including at least one of a combustion engine and an electric motor.

4 Claims, 2 Drawing Sheets

(56)                    References Cited

U.S. PATENT DOCUMENTS

| | | | |
|---|---|---|---|
| 2004/0132567 A1* | 7/2004 | Schonnenbeck | A01B 71/06 474/69 |
| 2010/0133019 A1* | 6/2010 | Muemken | B62D 21/186 180/9.21 |
| 2014/0262591 A1* | 9/2014 | Turner | B62D 21/186 296/184.1 |
| 2014/0278696 A1* | 9/2014 | Anderson | G06Q 10/047 705/7.23 |
| 2017/0188505 A1* | 7/2017 | Potier | A01B 79/005 |
| 2020/0296876 A1* | 9/2020 | Lussier | B62D 49/0635 |
| 2021/0212249 A1* | 7/2021 | Disberger | A01M 7/0089 |
| 2023/0265864 A1 | 8/2023 | Lubben et al. | |

* cited by examiner

AGRICULTURAL VEHICLE COMBINATION

CROSS-REFERENCE TO RELATED APPLICATIONS

This application claims priority to German Patent Application No. 102022111164.4, filed May 5, 2022, which is hereby incorporated by reference.

FIELD OF THE DISCLOSURE

The disclosure relates to an agricultural vehicle combination.

BACKGROUND

In agriculture, operators often have several different size agricultural work vehicles available for use.

SUMMARY

In order to allow for many different working situations that are encountered in the agricultural industry, users are often forced to keep agricultural tractors of different power classes available. For example, a relatively high-powered or heavy tractor is advantageous for ploughing and transport work, whereas maneuverability and the least possible ground compaction are of primary concern for carrying out loading, spraying, or sowing work. The latter, however, favors the use of a relatively compact and/or lightweight tractor.

In view of this, it is an object of the present disclosure to specify an inexpensive possibility that substantially eliminates the need for procuring agricultural tractors of different power classes.

This object is achieved by an agricultural vehicle combination having the features of one or more of the following embodiments.

The agricultural vehicle combination thus provided comprises an agricultural tractor, which is operated using a main drive unit, and comprises an ancillary drive unit, which is attached removably to the agricultural tractor by a three-point power lift or three-point hitch and which has an auxiliary axle that can be driven by an ancillary unit.

In this way, by attaching the ancillary drive unit, a relatively compact and/or lightweight tractor can be upgraded for applications which require increased tractive force, without the need to procure a further tractor intended specifically for this purpose. This is beneficial for example to relatively small agricultural businesses with limited financial means.

Here, the ancillary drive unit, for example a drive torque that is to be transmitted via the rear axle to the ground, is controlled by a control unit provided in the agricultural tractor. Via a communication interface established between the agricultural tractor and ancillary drive unit, for example in the form of an ISOBUS connection, the control unit coordinates the operation of the ancillary drive unit with that of the main drive unit in the agricultural tractor.

The main drive unit can include a combustion engine which is configured as a diesel engine and which, via a conventional (powershift) gearbox, has a drive connection to a driven rear axle and/or to a power take-off and to further operating devices of the agricultural tractor. The further operating devices include, for example, a hydraulic system which is fed by a high-pressure pump, and which serves for providing a supply to a hydraulic steering and braking system and to hydraulic control valve blocks (so-called SCVs), which are situated in the rear-end region of the agricultural tractor and which allow operation of hydraulic work functions of mounted or ancillary implements provided for connection thereto.

Advantageous embodiments of the agricultural vehicle combination are disclosed herein.

The ancillary unit provided for driving the auxiliary axle has a combustion engine and/or an electric motor. Here, the combustion engine and/or electric motor may be connected via an intermediate gearbox to ground-engaging means, which are comprised by the auxiliary axle, for the propulsion of the ancillary drive unit. The ground-engaging means are wheels, for example. Since the ancillary drive unit is used predominantly in work situations with increased tractive force requirement in a limited travelling speed range of up to 10 to 20 km/h, the intermediate gearbox can be of relatively simple structural configuration.

If the ancillary drive unit is not required, for example when travelling on roads, the ancillary drive unit can be moved into a raised transport position by the three-point power lift of the agricultural tractor, such that the wheel drive is not in contact with the ground.

Additionally, a further three-point power lift or three-point hitch for the attachment of a mounted or ancillary implement may be arranged in the rear-end region of the ancillary drive unit. The further three-point power lift can be in the same category as the three-point power lift assigned to the agricultural tractor, such that existing mounted or ancillary implements can be used universally on both three-point power lifts. The further three-point power lift is actuated by a lifting mechanism provided for lifting and lowering associated lower links. The lifting mechanism can be hydraulically actuatable from the agricultural tractor, for which purpose the lifting mechanism is attached to one of the hydraulic control valve blocks of the agricultural tractor. Here, the respective control valve block, and thus the lifting mechanism, may be actuated at the instigation of the control unit, for example in a manner dependent on an operator command input via a user interface.

In this context, it is possible that, in the rear-end region of the ancillary drive unit, there are situated a further power take-off and/or further hydraulic control valve blocks which allow operation of mechanical and/or hydraulic work functions of a mounted or ancillary implement attached to the further three-point power lift. In some embodiments, the further power take-off and/or the further hydraulic control valve blocks are operated by virtue of a direct connection to the power take-off and/or to the hydraulic control valve blocks of the agricultural tractor being established in the form of a mechanical or hydraulic "pass-through".

Alternatively, the power take-off of the ancillary drive unit may also be driven by the ancillary unit. If the ancillary unit comprises an electric motor, then provision may be made, in a generator operating mode of the electric motor, for the energy that is released during braking of the wheel drive to be recuperated and temporarily stored in a storage battery, which itself may be a structural part of the ancillary unit.

This opens the possibility inter alia of retrieving the electrical energy temporarily stored in the storage battery to use the electric motor to targetedly feed, via a gearbox, for example a power-split gearbox, a drive torque that assists the main drive unit into the power take-off of the agricultural tractor (so-called power boost). In other words, in such a case, the ancillary unit is configured to provide drive assistance to the main drive unit comprised by the agricultural tractor. On the other hand, the electrical energy stored in the storage battery may also be used to operate electrical drive units of a mounted or ancillary implement attached to the further three-point power lift.

To improve the steerability of the vehicle combination, it is possible for the ancillary drive unit to have an auxiliary steering system that can be actuated in accordance with a steering input at the tractor. The auxiliary steering system may be either of active design as an electrical, electrohydraulic, or hydraulic steering system or of passive design as a self-steering system, wherein, in the latter case, locking is implemented during reverse travel in order to allow for easier maneuvering of the vehicle combination.

A further possibility provides for the three-point power lift of the agricultural tractor to be equipped with a hydraulically or electrically length-adjustable upper link, wherein the length adjustment is performed for the purposes of varying the contact forces exerted on the ground via the auxiliary axle. The length adjustment is performed such that, in accordance with the mass and center of gravity of the mounted or ancillary implement attached to the further three-point power lift, the ground contact forces are distributed between the auxiliary axle and the driven rear axle of the agricultural tractor such that the greatest possible traction is achieved.

The above and other features will become apparent from the following detailed description and accompanying drawings.

BRIEF DESCRIPTION OF THE DRAWINGS

The agricultural vehicle combination according to the disclosure will be described in more detail below with reference to the appended drawings. Here, identical reference designations relate to corresponding components or components which are of comparable function. In the drawings.

DETAILED DESCRIPTION

The embodiments or implementations disclosed in the above drawings and the following detailed description are not intended to be exhaustive or to limit the present disclosure to these embodiments or implementations.

Figure 1:
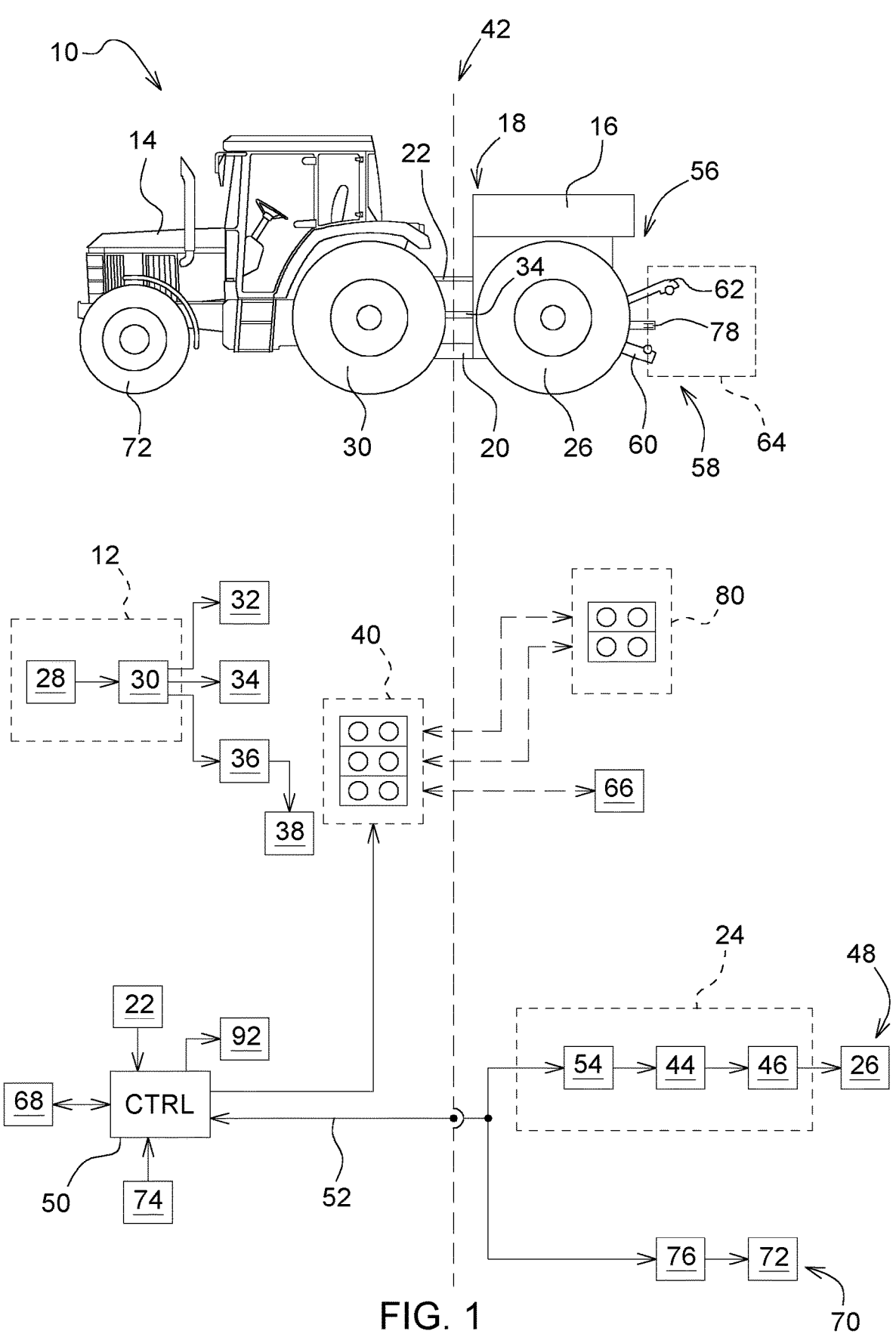
FIG. 1 shows a first exemplary embodiment of the agricultural vehicle combination according to the disclosure.

FIG. 1 shows a first exemplary embodiment of the agricultural vehicle combination according to the disclosure.

The agricultural vehicle combination 10 comprises an agricultural tractor 14, which is operated using a main drive unit 12, and comprises an ancillary drive unit 16. The ancillary drive unit 16 is attached removably to the agricultural tractor 14 by a three-point power lift or three-point hitch 18 via associated lower links 20 and an upper link 22 and has an auxiliary axle 26 that can be driven by an ancillary unit 24.

In the example, the main drive unit 12 situated in the agricultural tractor 14 comprises a combustion engine 28 which is configured as a diesel engine and which, via a conventional (powershift) gearbox 30, has a drive connection to a driven rear axle 32 and/or to a power take-off 34 and to further operating devices 36 of the agricultural tractor 14. The further operating devices 36 include a hydraulic system which is fed by a high-pressure pump (not illustrated), and which serves for providing a supply to a hydraulic steering and braking system 38 and to hydraulic control valve blocks 40, which are situated in the rear-end region 42 of the agricultural tractor 14 and which allow operation of hydraulic work functions of mounted or ancillary implements provided for connection thereto.

In the present case, the ancillary unit 24 provided for driving the auxiliary axle 26 has its own combustion engine 44. The further combustion engine 44 is connected via an intermediate gearbox 46 to ground-engaging means 48, which are comprised by the auxiliary axle 26, for the propulsion of the ancillary drive unit 16.

Here, the ancillary drive unit 16, for example a drive torque that is to be transmitted by the further combustion engine 44 via the auxiliary axle 26 to the ground, is controlled by a control unit 50 (e.g., a controller including a processor and memory) provided in the agricultural tractor 14. Via a communication interface, which in the example is an ISOBUS connection 52, the control unit 50 coordinates the operation of the ancillary drive unit 16 with that of the main drive unit 12 in the agricultural tractor 14. For this purpose, the ISOBUS connection 52 communicates with an engine control unit 54, comprised by the ancillary unit 24, of the further combustion engine 44.

In the rear-end region 56 of the ancillary drive unit 16, there is arranged a further three-point power lift or three-point hitch 58, to which a (schematically illustrated) mounted or ancillary unit 64 is attached removably via respective lower links 60 and an upper link 62. The further three-point power lift 58 is in the same category as the three-point power lift 18 assigned to the agricultural tractor 14, such that existing mounted or ancillary implements can be used universally on both three-point power lifts 18, 58. The further three-point power lift 58 is actuated by a lifting mechanism 66 provided for raising and lowering the lower links 60.

In the present case, the lifting mechanism 66 is hydraulically actuatable from the agricultural tractor 14, for which purpose the lifting mechanism is attached to one of the hydraulic control valve blocks 40 of the agricultural tractor 14. Here, the respective control valve block, and thus the lifting mechanism 66, are actuated at the instigation of the control unit 50, for example in a manner dependent on an operator command input via a user interface 68.

To improve the steerability of the vehicle combination 10, the ancillary drive unit 16 has an auxiliary steering system 70 that can be actuated in accordance with a steering input at the tractor. The auxiliary steering system 70 is either of active design as an electrical, electrohydraulic, or hydraulic steering system or of passive design as a self-steering system, wherein, in the latter case, locking is implemented during reverse travel in order to allow for easier maneuvering of the vehicle combination 10. In the case of an active auxiliary steering system 70, the steering input at the tractor arises from a steering angle detected by a rotational angle sensor 74 in the region of a steerable front axle 72 of the agricultural tractor 14, wherein the steering angle is used by the control unit 50 for the purposes of correspondingly controlling an electrical, electrohydraulic or hydraulic actuator 76 that is used to steer the auxiliary axle 26. Here, the actuator 76 is controlled by the control unit 50 via the ISO-BUS connection 52.

Additionally, the upper link 22 of the three-point power lift 18 on the agricultural tractor 14 is configured to be hydraulically length-adjustable. The length adjustment is performed by the control unit 50 so as to vary the contact forces exerted on the ground via the auxiliary axle 26, for example such that, in accordance with the mass and center of gravity of the mounted or ancillary implement 64 attached to the further three-point power lift 58, the ground contact forces are distributed between the auxiliary axle 26 and the driven rear axle 32 of the agricultural tractor 14 such that the greatest possible traction is achieved.

Furthermore, in the rear-end region 56 of the ancillary drive unit 16, there are situated a further power take-off 78 and/or further hydraulic control valve blocks 80 which allow operation of mechanical and/or hydraulic work functions of the mounted or ancillary implement 64 attached to the further three-point power lift 58. In the case of the embodiment of the ancillary drive unit 16 illustrated in FIG. 1, the further power take-off 78 and/or the further hydraulic control valve blocks 80 are operated by virtue of a direct connection to the power take-off 34 and/or to the hydraulic control valve blocks 40 of the agricultural tractor 14 being established in the form of a mechanical or hydraulic "pass-through".

Figure 2:
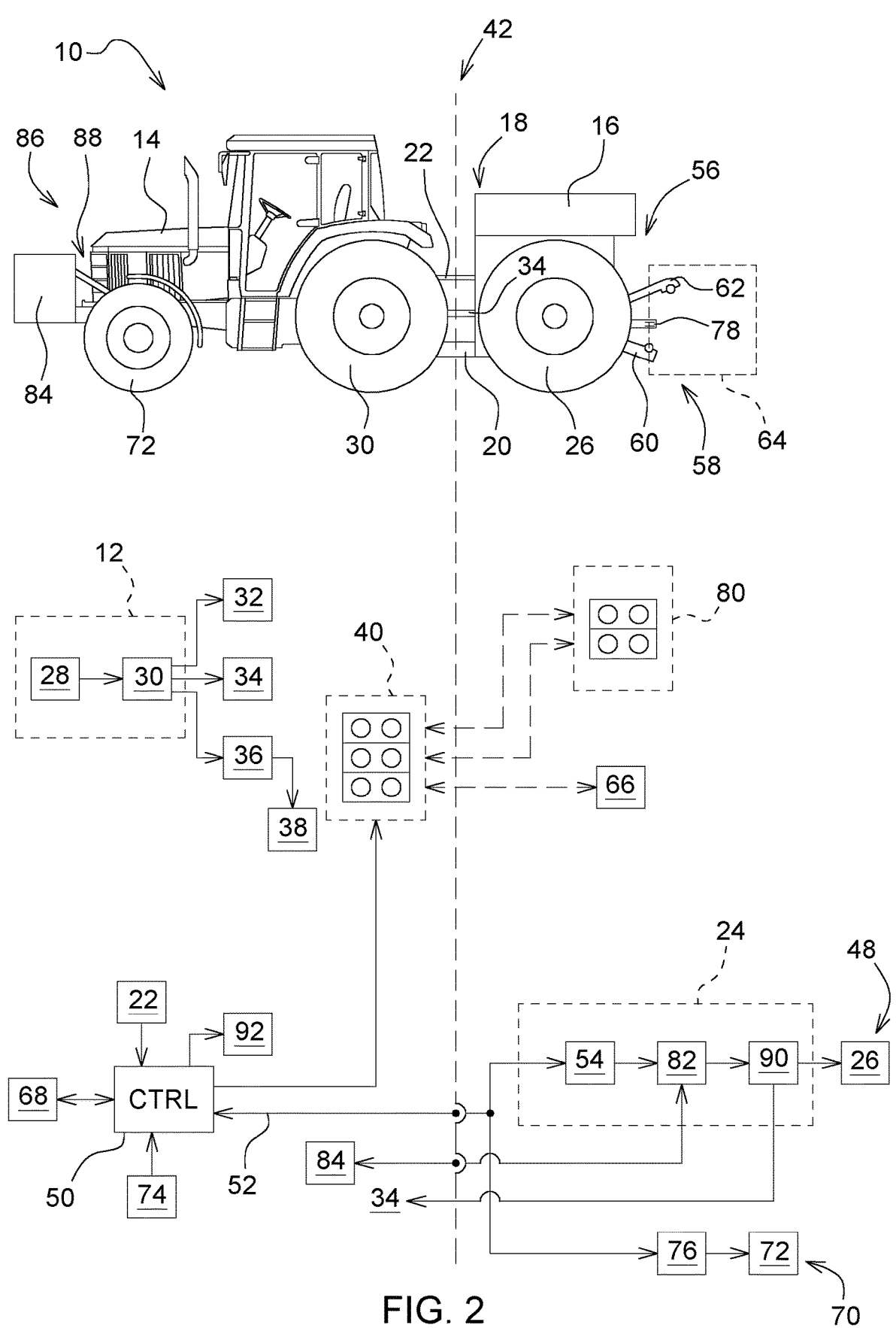
FIG. 2 shows a second exemplary embodiment of the agricultural vehicle combination according to the disclosure.

A different embodiment of the ancillary drive unit 16 is shown in FIG. 2. This provides for the further power take-off 78 of the ancillary drive unit 16 to be driven by an electric motor 82, which is comprised by the ancillary unit 24 and which is provided instead of the combustion engine 44. Here, provision is made, in a generator operating mode of the electric motor 82, for the energy that is released during braking of the ground-engaging means 48 to be recuperated and temporarily stored in a storage battery 84. In FIG. 2, the storage battery 84 is attached to a three-point power lift 88 provided in the front region 86 of the agricultural tractor 14, though the storage battery 84 may also be a structural part of the ancillary unit 24.

By retrieving the electrical energy temporarily stored in the storage battery 84, the electric motor 82 can be used to targetedly feed, in the present case via a power-split gearbox 90, a drive torque that assists the main drive unit 12 into the power take-off 34 of the agricultural tractor 14 (so-called power boost). In other words, in such a case, the ancillary unit 24 is configured to provide drive assistance to the main drive unit 12 comprised by the agricultural tractor 14. On the other hand, the electrical energy temporarily stored in the storage battery 84 may also be used to operate electrical drive units (not shown) of the mounted or ancillary implement 64 attached to the further three-point power lift 58.

If the ancillary drive unit 16 is not required, for example when travelling on roads, the ancillary drive unit can be moved into a raised transport position by the three-point power lift 18 of the agricultural tractor 14, such that the wheel drive is not in contact with the ground. For this purpose, the lower links 20 of the three-point power lift 18 can, at the instigation of the control unit 50 and in a manner dependent on an operator command input via the user interface 68, be raised or lowered by an associated lifting mechanism 92.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. An agricultural vehicle combination, comprising:
   an agricultural tractor including a main drive unit, a power take-off, a rear three-point hitch, a front three-point hitch, a hydraulic steering and braking system, and a hydraulic control valve block;
   an ancillary drive unit including an auxiliary axle, an electric motor, a power-split gearbox connected to the power take-off of the agricultural tractor, a further three-point hitch, a further power take-off, a further hydraulic control valve block connected to the hydraulic control valve block of the agricultural tractor, and an auxiliary steering system of active design actuated in accordance with a steering input of the tractor, the ancillary drive unit removably attached to the agricultural tractor by the rear three-point hitch;
   a storage battery attached to the front three-point hitch of the agricultural tractor;
   in a generator operating mode, the electric motor recuperates and temporarily stores energy released during braking of the auxiliary axle in the storage battery; and
   in a power boost mode, the electric motor retrieves the energy temporarily stored in the storage battery to feed via the power-split gearbox into the power take-off of the agricultural tractor.

2. The agricultural vehicle combination of claim 1, wherein the further three-point hitch for the attachment of a mounted or ancillary implement is arranged in a rear-end region of the ancillary drive unit.

3. The agricultural vehicle combination of claim 1, wherein the ancillary drive unit is configured to provide drive assistance to the main drive unit of the agricultural tractor.

4. The agricultural vehicle combination of claim 1, wherein the rear three-point hitch of the agricultural tractor is equipped with at least one of a hydraulically or electrically length-adjustable upper link, wherein the length adjustment is performed for the purposes of varying the contact forces exerted on the ground via the auxiliary axle.

* * * * *